US009143897B2

(12) United States Patent
Kuramura et al.

(10) Patent No.: US 9,143,897 B2
(45) Date of Patent: Sep. 22, 2015

(54) METHOD AND APPARATUS FOR PROVIDING AN APPLICATION ENGINE BASED ON REAL-TIME COMMUTE ACTIVITY

(71) Applicant: Nokia Corporation, Espoo (FI)

(72) Inventors: Don Yamato Kuramura, Redondo Beach, CA (US); Bryan Thomas Biniak, Pacific Palisades, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/669,116

(22) Filed: Nov. 5, 2012

(65) Prior Publication Data
US 2014/0129130 A1 May 8, 2014

(51) Int. Cl.
*H04W 4/02* (2009.01)
*H04W 4/04* (2009.01)
*G01C 21/00* (2006.01)
*G01C 21/36* (2006.01)
(Continued)

(52) U.S. Cl.
CPC .............. *H04W 4/025* (2013.01); *G01C 21/00* (2013.01); *G01C 21/3682* (2013.01); *G01C 21/3697* (2013.01); *H04W 4/02* (2013.01); *A63F 13/332* (2014.09); *H04W 4/008* (2013.01); *H04W 4/185* (2013.01)

(58) Field of Classification Search
CPC ........... A63F 13/00; A63F 13/12; A63F 9/14; G06F 17/00; G06F 19/00
USPC ............ 701/400, 423, 516; 463/6, 30, 40–42; 340/7.48, 988; 700/90–93; 235/384, 235/375
See application file for complete search history.

(56) References Cited

U.S. PATENT DOCUMENTS 6,080,063 A * 6/2000 Khosla ............................ 463/42
6,287,200 B1 * 9/2001 Sharma ........................... 463/40
(Continued)

FOREIGN PATENT DOCUMENTS

GB    2417694 A    3/2006
GB    2424842 A    10/2006

OTHER PUBLICATIONS

International Search Report for corresponding international application No. PCT/FI2013/050968, mailed Dec. 27, 2013, 6 pages.
(Continued)

*Primary Examiner* — Thomas Tarcza
*Assistant Examiner* — Tyler J Lee
(74) *Attorney, Agent, or Firm* — Ditthavong & Steiner, P.C.

(57) ABSTRACT

An approach is provided for an application engine (e.g., a gaming engine) based on real-time location-based data. In one embodiment, an application engine determines one or more location-based data sources associated with at least one device. The one or more location-based data sources are determined in at least substantially real-time while the at least one device is engaged in at least one travel activity. The application engine then determines one or more elements of an application engine based, at least in part, on the one or more location-based data sources. The application engine causes, at least in part, the one or more elements at the least one device during the at least one travel activity. In one embodiment, the application engine also causes, at least in part, a transformation of the one or more map data elements based, at least in part, on the one or more location-based data sources.

18 Claims, 17 Drawing Sheets

(51) Int. Cl.
*A63F 13/332* (2014.01)
*H04W 4/00* (2009.01)
*H04W 4/18* (2009.01)

(56) References Cited

U.S. PATENT DOCUMENTS

| | | | | |
|---|---|---|---|---|
| 6,306,038 | B1* | 10/2001 | Graves et al. | 463/40 |
| 6,320,495 | B1* | 11/2001 | Sporgis | 340/323 R |
| 6,579,175 | B2* | 6/2003 | Suzuki | 463/7 |
| 6,932,698 | B2* | 8/2005 | Sprogis | 463/9 |
| 7,828,655 | B2* | 11/2010 | Uhlir et al. | 463/30 |
| 7,934,983 | B1* | 5/2011 | Eisner | 463/6 |
| 7,967,678 | B2* | 6/2011 | Dougherty et al. | 463/30 |
| 8,668,585 | B2* | 3/2014 | Ackley et al. | 463/39 |
| 2003/0064712 | A1 | 4/2003 | Gaston et al. | |
| 2004/0176082 | A1* | 9/2004 | Cliff et al. | 455/414.4 |
| 2005/0009608 | A1* | 1/2005 | Robarts et al. | 463/42 |
| 2005/0202877 | A1* | 9/2005 | Uhlir et al. | 463/43 |
| 2006/0154713 | A1 | 7/2006 | Sunazuka et al. | 463/6 |
| 2007/0060408 | A1* | 3/2007 | Schultz et al. | 473/131 |
| 2007/0087828 | A1* | 4/2007 | Robertson | 463/42 |
| 2008/0039203 | A1* | 2/2008 | Ackley et al. | 463/40 |
| 2008/0054072 | A1* | 3/2008 | Katragadda et al. | 235/384 |
| 2008/0146338 | A1 | 6/2008 | Bernard et al. | |
| 2009/0005140 | A1* | 1/2009 | Rose et al. | 463/7 |
| 2010/0082735 | A1* | 4/2010 | Petersen et al. | 709/203 |
| 2012/0243528 | A1* | 9/2012 | Frye et al. | 370/350 |

OTHER PUBLICATIONS

Written Opinion for corresponding international application No. PCT/FI2013/050968, mailed Dec. 27, 2013, 9 pages.
Bjork et al., "Pirates! Using the Physical World as a Game Board", Proceedings of 8th International Conference on Human-Computer Interactions (INTERACT 2001), Tokyo, Japan, Jul. 9-13, 2001, pp. 423-430, retrieved from Internet on Dec. 20, 2013, http://www.cc.gatech.edu/~keith/classes/ubicomplexity/pdfs/apps/bjoerk-pirates.pdf.
Schlieder et al., "Geogames: Designing Location-Based Games from Classic Board Games", IEEE Intelligent Systems, vol. 21, Sep. 1, 2006, pp. 40-46.

* cited by examiner

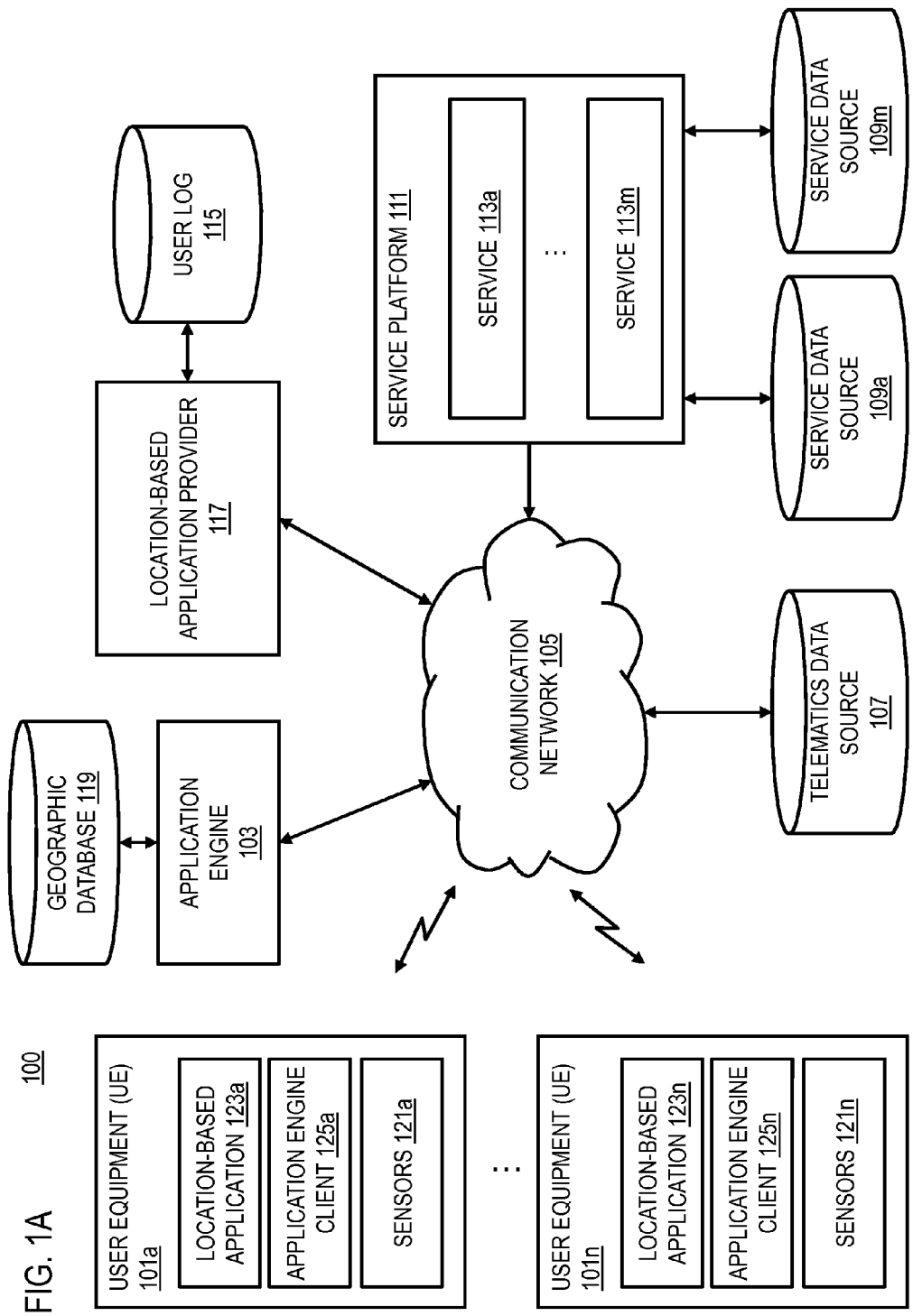

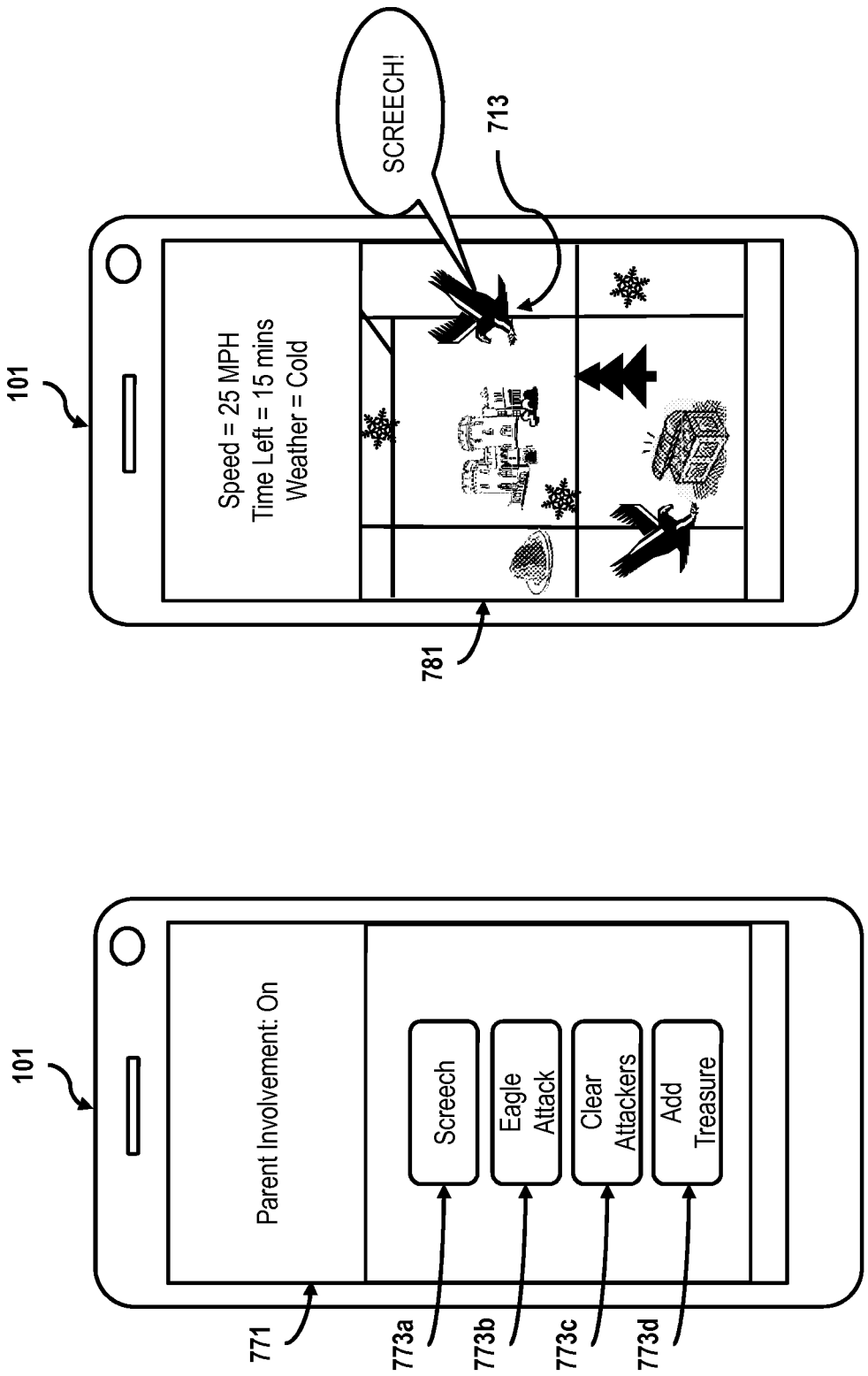

METHOD AND APPARATUS FOR PROVIDING AN APPLICATION ENGINE BASED ON REAL-TIME COMMUTE ACTIVITY

BACKGROUND

Service providers (e.g., wireless, cellular, etc.) and device manufacturers are continually challenged to deliver value and convenience to consumers by, for example, providing compelling network services. One area of development has been related to location-based services (e.g., mapping, navigation, geo-tagged or location-based data, hyper-local searches, etc.), which has resulted in a growing variety of location-related services and applications available to users. For example, users commonly employ navigation services (e.g., via in-vehicle navigation systems, personal navigation devices, mobile devices, etc.) when commuting or otherwise engaging in travel related activities. However, when engaged in such navigation or other location-based services, users can become engaged with the services at the expense of interactivity with other users. As a result, service providers and device manufacturers face significant technical to providing location-based services and/or applications that support commute or travel activities while also increasing a sense of interactivity with other users as well as the commute or travel environment.

Some Example Embodiments

Therefore, there is a need for an approach for providing an application engine or platform (e.g., a gaming engine) whose elements or mechanics (e.g., game play mechanics) reflect real-time location-based data determined during commute or travel activities.

According to one embodiment, a method comprises determining one or more location-based data sources associated with at least one device. The one or more location-based data sources are determined in at least substantially real-time while the at least one device is engaged in at least one travel activity. The method also comprises determining one or more elements of an application engine based, at least in part, on the one or more location-based data sources. The method further comprises causing, at least in part, the one or more elements at the least one device during the at least one travel activity. In one embodiment, the method further comprises causing, at least in part, a transformation of one or more map data elements based, at least in part, on the one or more location-based data sources.

According to another embodiment, an apparatus comprises at least one processor, and at least one memory including computer program code for one or more computer programs, the at least one memory and the computer program code configured to, with the at least one processor, cause, at least in part, the apparatus to determine one or more location-based data sources associated with at least one device. The one or more location-based data sources are determined in at least substantially real-time while the at least one device is engaged in at least one travel activity. The apparatus is also caused to determine one or more elements of an application engine based, at least in part, on the one or more location-based data sources. The apparatus is further caused to present the one or more elements at the least one device during the at least one travel activity. In one embodiment, the apparatus is further caused to transform one or more map data elements based, at least in part, on the one or more location-based data sources.

According to another embodiment, a computer-readable storage medium carries one or more sequences of one or more instructions which, when executed by one or more processors, cause, at least in part, an apparatus to process and/or facilitate a processing of one or more location logs to determine one or more location-based data sources associated with at least one device. The one or more location-based data sources are determined in at least substantially real-time while the at least one device is engaged in at least one travel activity. The apparatus is also caused to determine one or more elements of an application engine based, at least in part, on the one or more location-based data sources. The apparatus is further caused to present the one or more elements at the least one device during the at least one travel activity. In one embodiment, the apparatus is further caused to transform one or more map data elements based, at least in part, on the one or more location-based data sources.

According to another embodiment, an apparatus comprises means for determining one or more location-based data sources associated with at least one device. The one or more location-based data sources are determined in at least substantially real-time while the at least one device is engaged in at least one travel activity. The apparatus also comprises means for determining one or more elements of an application engine based, at least in part, on the one or more location-based data sources. The apparatus further comprises means for causing, at least in part, the one or more elements at the least one device during the at least one travel activity. In one embodiment, the apparatus further comprises means for causing, at least in part, a transformation of the one or more map data elements based, at least in part, on the one or more location-based data sources.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a system capable of providing an application engine based on real-time commute activity, according to one embodiment;

FIGS. 7A-7I are diagrams of user interfaces utilized in the processes of FIGS. 1-6, according to various embodiments;

DESCRIPTION OF SOME EMBODIMENTS

Figure 1B:
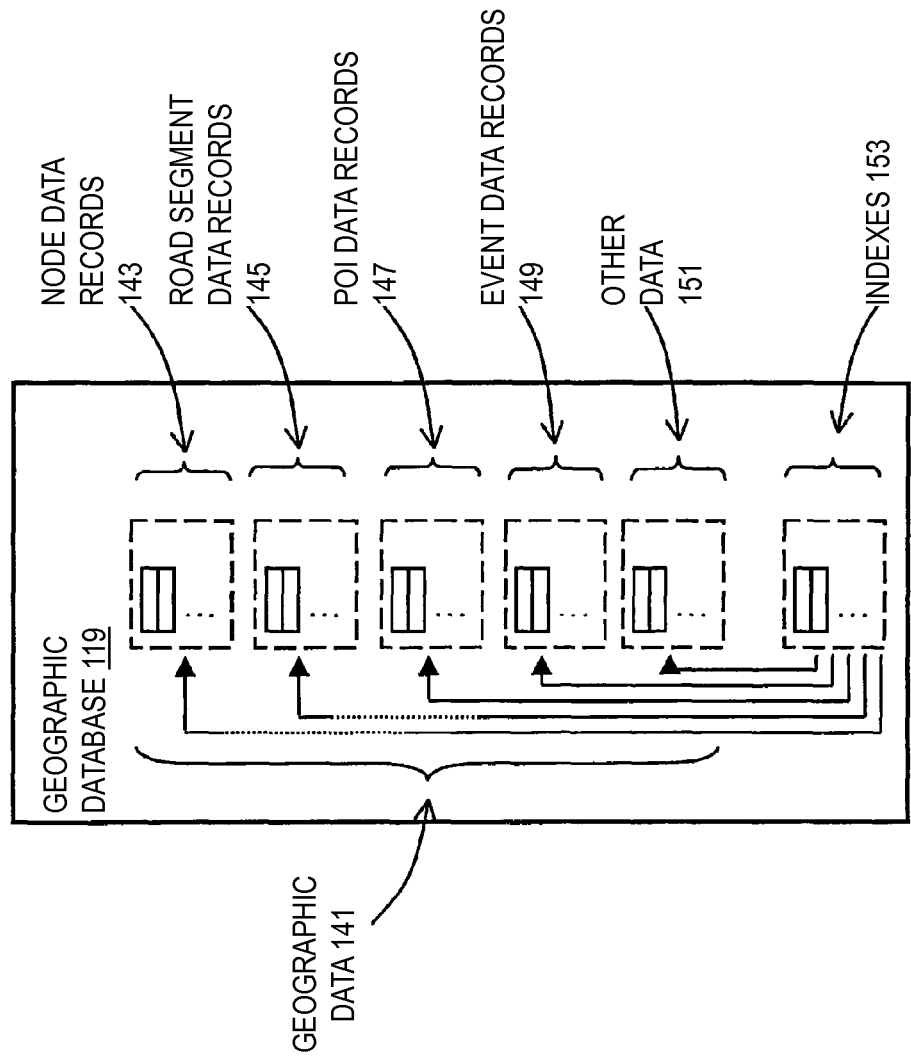
FIG. 1B is a diagram of a geographic database, according to one embodiment.

Examples of a method, apparatus, and computer program for providing an application engine based on real-time commute activity are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are discussed with respect to location-based data sources determined during commute activity, it is contemplated that the various embodiments are also applicable to any travel-related activity even if the travel is not related to regular travel patterns determined from commute activities. In addition, although various embodiments are discussed with respect to an application engine that is a gaming engine or platform, it is contemplated that the various embodiments are also applicable to any type of application engine that uses or relates to location-based data including, for instance, applications for modeling location-based data, consuming geo-tagged media data, productivity applications that use location-based data, and the like.

FIG. 1A is a diagram of a system capable of providing an application engine based on real-time commute activity, according to one embodiment. Historically, application engines or platforms provide functions, routines, code, application programming interfaces, data structures, etc. for defining the mechanics, data, user interface, media assets, etc. of an application or group of applications. One example of an application engine is a gaming engine or platform that provides tools for developing gaming worlds and/or the mechanics that operate within the worlds. Traditionally, gaming applications rely on application engines that use predefined imaginary worlds or model the real-world for specific locations to provide the underlying gaming world for the user. Typically, these gaming worlds are self-contained and provide an immersive environment that can distract users from live real-world conditions. While such immersive environments can be quite compelling, users may often become disconnected and lose interactivity with their surrounding environment as they engage in traditional games and applications.

To address this challenge, a system 100 of FIG. 1 introduces the capability to provide an application engine that is affected by live location-based data sources collected as users travel or commute. In one embodiment, the system 100 provides an application engine/platform where the application mechanics (e.g., game play mechanics in the case of a gaming engine) are affected (e.g., in substantially real-time) by live telematics (e.g., in-vehicle telematics data), live navigation data (e.g., routing information, estimated time of arrival, etc.), real-world factors (e.g., weather, local events, etc.), human behavior (e.g., user behavior or behavior of other users nearby). As used herein, the term "substantially real-time" refers making the application engine reflect real-time data sources as they are collected or within a sufficiently short period of time as to give the user the appearance application engine is responding to a real-time event as the event is happening. Accordingly, the system 100 enables an immersive application or gaming experience while reflecting or maintaining a connection to real-world experiences as they occur along a commute or other travel activity.

In one example use case, in the context of a gaming engine, children traveling (e.g., commuting) with their parents can become active and engaged passengers by following along with a visually themed map in a gaming application. For example, the system 100 provides for transformation multiple content layers including streets, roads, traffic, weather, true clock, calendar information, car onboard telematics data, navigation data, terrain, and the like so that they can be incorporated into the gaming engine. In one embodiment, as the map or terrain changes during the commute, the system 100 dynamically transforms the underlying map data (e.g., map data normally presented in a navigation application) according to a theme or motif appropriate for the game. Game events or game mechanics can then be determined based on the location or the commute's progress. For example, the system 100 can trigger game events by points or interests along the commute path or when the parent or child taps on objects on the path. In one embodiment, the game events or objects (e.g., application elements) are determined by the actual location and environment of the user during the commute.

In one embodiment, the application events or mechanics may relate to providing additional content to supplement the application (or game play in the case of gaming applications). For example, the additional content may include relevant annotations (e.g., providing descriptions of landmarks or other points of interest), advertising or promotional information (e.g., discounts on related products or services), and the like. In one embodiments, the additional content may include user-created content such as user-created points of interest (POI) data (e.g., application-specific or real-world POI data), user-created application/game data (e.g., additional game items such as treasure), as well as tracking information (e.g., GPS and live game data) for friends of the user.

In one embodiment, external factors (e.g., determine from real-time or substantially real-time location-based data sources that affect game play include, but are not limited, to speed, location, weather, traffic, estimated time to destination, etc. In one embodiment, the system 100 provides a continuous and immersive adaptation of real-world location-based data into the application or gaming context. In other embodiments, the system 100 enables multi-user (e.g., multi-player) interaction between game participants ranging from large groups of users (e.g., communities of online game players) to closer knit interaction between parent and child traveling together. For example, parent-child interaction may include the parent triggering game or application events so that the child may engage with those events in the gaming application. As a result, rather than having the child remain immersed solely in the game, the system 100 encourages parent-child interaction during the commute or travel through this interactivity scheme.

As shown in FIG. 1, the system 100 comprises user equipment (UEs) 101a-101n (also collectively referred to as UEs 101) having connectivity to an application engine 103 (e.g., a gaming engine or platform) via a communication network 105. In one embodiment, the application engine 103 can assimilate multiple disparate live data sources into a live location-based data model that can affect application mechanics (e.g., game play mechanics) as the locations of the UEs 101 change (e.g., during a commute or other travel activity). For example, affecting application mechanics may include determining what functions or operations to invoke or make available, as well as determining the user interface (e.g., visual/audio characteristics, modes of interaction, etc.) of the application.

By way of example, the disparate live or real-time location-based data sources include, but are not limited, to (a) telematics data source 107; (b) service data sources 109a-109m (also collectively referred to as service data sources 109) of the service platform 111 and/or services 113a-113k (also collectively referred to as services 113); (c) user log 115 associated with the location-based application provider 117; (d) geographic database 119; or (e) a combination thereof.

In one embodiment, the telematics data source 107 includes both in-vehicle telematics and navigation information associated with the UE 101. For example, the telematics data source 107 can include traffic conditions of the current path of the UE 101 as well as routing/navigation information such as distance to location, time remaining to destination, path to destination, speed of travel, and the like. Other types of data provided by the telematics data source 107 vehicle direction, orientation (e.g., including pitch, yaw, and altitude) and driving behavior. In one embodiment, the system 100 determines the telematics data in the telematics data source 107 from one or more sensors 121a-121n (also collectively referred to as sensors 121) of the UE 101 (e.g., accelerometers, GPS sensors, compass sensor, etc.). In addition, the system 100 may determine the telematics data by interfacing with a vehicle (e.g., a car via an OBD II connection), through operation of location-based applications 123a-123n (also collectively referred to as location-based applications 123) such as a navigation or mapping application, or a combination thereof.

In one embodiment, service data sources 109 include location-based data generated by the service platform 111 and/or the services 113. By way of example, the services 113 may provide real-time data such as current weather conditions, local news events, geo-tagged media (e.g., geo-tagged photographs or videos), etc. In another embodiment, the services 113 may include social networking services. Accordingly, the service data sources 109 may include location information (e.g., locations, routes, paths, etc.) for friends collected through the social networking services or other location check-in/tracking services. It is contemplated that the services 113 and resulting service data sources 109 may include any type of service data that may provide location-based information and/or other contextual information that are associated with the location, navigation paths, commute, or travel of the UEs 101.

In one embodiment, the user log 115 provides information on user behavior, profile, and/or preferences collected, for instance, by the location-based application provider 117 from user interactions with applications and/or games executed on the UEs 101 (e.g., interactions or behaviors determined during game play). In one embodiment, the interactions may include multi-user interaction such as when playing multi-player games or when a parent configures game play mechanics for a child playing a game or using an application. By way of example, the location-based application provider 117 may include developers, distributors, publishers, etc. associated with a particular application. In addition or alternatively, the location-based application provider 117 may be an operator of an online application store or other application repository. In one embodiment, the user log 115 also includes profile information such as a user's age, gender, grade, birth date, language, address, key destinations, hobbies, likes/dislikes, favorite characters, etc. In some embodiments, the location-based application provider 117 may operate an online store where users may purchase virtual items or goods that can be presented by the application engine 103 in the corresponding application or game. By way of example, the virtual items or goods that are purchased become part of the elements of the application that can be processed by the application engine 103.

In one embodiment, other types of contextual information associated with the UE 101's location and/or associated users may be used by the system 100 to affect application mechanics or other application elements. For example, such contextual information may include time of day, day of week, seasons, upcoming holidays, upcoming special events, user calendar information, etc.

In one embodiment, the geographic database 119 includes map data that can be used determine application elements. For example, the map data may include (a) street type (e.g., road, dirt road, bike path, freeway, tool roads, etc.), terrain features (e.g., rivers, oceans, lakes, mountains, hills, etc.), street width (e.g., including number of lanes), city block information (e.g., dimension, orientation, density, etc.), city information (e.g., population, urban vs. rural, etc.), points of interest, and the like. For example, during game play, by passing a point of interest such as a gas station, restaurant, or other landmarks, a player can increase his or her power or earn game points.

As discussed above, the system 100 assimilates these real-time location-based data sources and determines how the sources can affect application elements and/or mechanics. In one embodiment, the system 100 presents the application elements and/or mechanics to the user via application engine clients 125a-135n (also collectively referred to as application engine clients 125) of the UEs 101. By way of example, the application engine clients 125 can be a standalone application or game. In some embodiments, the application engine client 125 can be a separate component of executing on the UEs 101 to provide one or more functions described with respect to the application engine 103. In another embodiment, the application engine client 125 may perform all or a portion of the functions of the application engine 103. In yet another embodiment, the application engine client 125 may work cooperatively with the application engine 103 to offload or balance the resource burdens associated with the performing application and/or gaming functions.

In one embodiment, to provide for interactivity among users, the system 100 (e.g., via the application engine 103) also enables one user to control or affect application elements for presentation to another user. For example, if a parent (e.g., a first user) is traveling with a child (e.g., a second user), and the child is playing a location-based game supported by the application engine 103, the parent can provide input that can affect the child's game play. In one embodiment, the parent can provide the input (e.g., as voice commands or as input via another UE 101 with connectivity to the application engine 103) during game play or pre-configure the input before game play begins. In other embodiments, the system 100 may support interactivity among multiple users and/or players as part of a larger application or gaming community. For example, interactivity is not limited to single families or groups traveling together, instead it is contemplated that the various embodiments described herein are applicable to environments such as a Massively Multiplayer Online Role-Playing Game (MMORPG) environment or other environments with large numbers or participating users. In these environments, the application engine 103 receives real-time location-based data from large groups of users for determining how the users are to be represented in the application or game world, and for how the users interact with elements of the application or game world.

In another embodiment, the application engine 103 can monitor a user's progress in an application or game. In this way, the application engine 103 can report the program from one user to another user. For example, if a child is playing a game and achieves a location-based accomplishment in the game (e.g., find a treasure, achieve a score, etc.), the application engine can report the information along with location information to another user (e.g., a remotely located parent, grandparent, etc.). In some embodiments, a user's progress can be tracked on a leaderboard or other scoreboard. In one embodiment, the leaderboard can be based on characteristics of the users such as age/grade, location, language, state, country, difficult level, etc.

In one embodiment, the functions of the application engine 103 include providing transformations of map data elements in response to the real-time location based data sources. For example, map transformations may include altering the physical appearance of map tiles or other map data elements to confirm with motifs or themes determined by the application engine.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network (e.g., Bluetooth®, wireless fidelity (WiFi), worldwide interoperability for microwave access (WiMAX), near-field communication (NFC), etc.), or any other suitable packet-switched network, such as a commercially-owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., WiMAX, Long Term Evolution (LTE) networks, code division multiple access (CDMA), wideband code division multiple access (WCDMA), WiFi, wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101 and the application engine 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the application engine client 125 and the application engine 103 can interact according to a client-server model. It is noted that the client-server model of computer process interaction is widely known and used. According to the client-server model, a client process sends a message including a request to a server process, and the server process responds by providing a service. The server process can also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

FIG. 1B is a diagram of a geographic database, according to one embodiment. In one embodiment, the map data elements and/or the transformed map data elements may be stored, associated with, and/or linked to the geographic database 119 or data thereof. In one embodiment, the geographic or map database 119 includes geographic data 141 used for (or configured to be compiled to be used for) navigation-related services. For example, the geographic database 119 includes node data records 143, road segment or link data records 145, POI data records 147, event data records 149, and other data records 151. More, fewer, or different data records may be provided. In one embodiment, the other data records 151 include cartographic ("carto") data records, routing data, and maneuver data. One or more portions, components, areas, layers, features, text, and/or symbols of the POI or event data may be stored in, linked to, and/or associated with one or more of these data records. For example, one or more portions of the POI or event data may be matched with respective map or geographic records via position or GPS data associations (such as using known or future map matching or geo-coding techniques).

In one embodiment, the road segment data records 145 are links or segments representing roads, streets, or paths. The node data records 143 are end points corresponding to the respective links or segments of the road segment data records 145. The road link data records 145 and the node data records 143 represent a road network, such as used by vehicles, cars, and/or other entities. Alternatively, the geographic database 119 contains path segment and node data records or other data that represent pedestrian paths or areas in addition to or instead of the vehicle road record data.

The road/link segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 119 may include data about the POIs and their respective locations in the POI data records 147. The geographic database 119 may also include data about places, such as cities, towns, or other communities, and other geographic features, such as bodies of water, mountain ranges, etc. Such place or feature data may be part of the POI data 147 or may be associated with POIs or POI data 147 (such as a data point used for displaying or representing a position of a city). In addition, the geographic database 119 may include data about location-based events and their respective locations in the event data records 147. By way of example, the location-based events include any type of event that is associated with a particular location including, for instance, traffic, accidents, construction, public gatherings, etc.

The geographic database 119 may be maintained by a service 113 (e.g., a map developer). For example, the map developer can collect geographic data to generate and enhance the database 119. There are different ways used by the map developer to collect data. These ways include obtaining data from other sources, such as municipalities or respective geographic authorities. In addition, the map developer may employ field personnel to travel by vehicle along roads throughout the geographic region to observe features and/or record information about them. Also, remote sensing, such as aerial or satellite photography, may be used.

The geographic database 119 may be a master geographic database stored in a format that facilitates updating, maintenance, and development. For example, the master geographic database 119 or data in the master geographic database 119 is in an Oracle spatial format or other spatial format, such as for development or production purposes. The Oracle spatial format or development/production database may be compiled into a delivery format, such as a GDF format. The data in the production and/or delivery formats may be compiled or further compiled to form geographic database products or databases, which may be used in end user navigation devices or systems.

For example, geographic data is compiled (such as into a PSF format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

As mentioned above, the database 119 may be a master geographic database, but in alternate embodiments, the database may represent a compiled navigation database that may be used in or with end user devices (e.g., UEs 101) to provide navigation-related functions. For example, the database 119 may be used with the end user device 101 to provide an end user with navigation features or for interaction with the application engine 103. In such a case, the database may be downloaded or stored on the end user device 101, or the end user device 101 may access the database 119 through a wireless or wired connection (such as via a server and/or network 105).

In one embodiment, the end user device or UE 101 is an in-vehicle navigation system, a personal navigation device ("PND"), a portable navigation device, a cellular telephone, a mobile phone, a personal digital assistant ("PDA"), a watch, a camera, a computer, and/or other device that can perform navigation-related functions, such as digital routing and map display. In one embodiment, the navigation device 101 is a cellular telephone. An end user may use the device 101 for navigation functions such as guidance and map display as well as to access application supported by the application engine 103.

Figure 2:
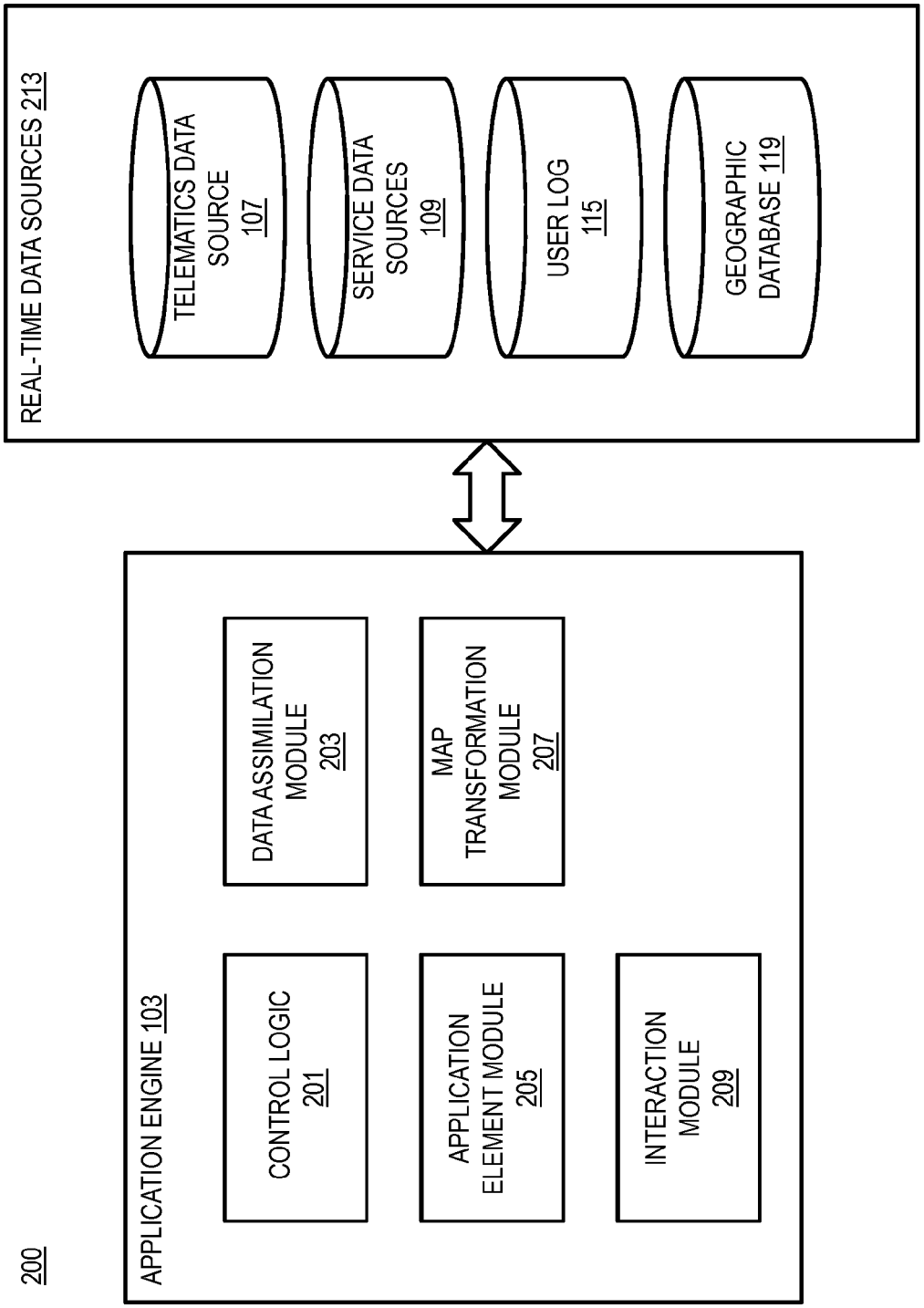
FIG. 2 is a diagram of the components of an application engine, according to one embodiment.

FIG. 2 is a diagram of the components of an application engine 103, according to one embodiment. By way of example, the application engine 103 includes one or more components for affecting elements (e.g., application mechanics, application interface, application functions, etc.) based on real-time location based data sources. It is contemplated that the functions of these components may be combined in one or more components or performed by other components of equivalent functionality (e.g., the application engine client 125). In this embodiment, the application engine 103 includes a control logic 201, a data assimilation module 203, an application element module 205, a map transformation module 207, an interaction module 209, and a client interface 211.

In one embodiment, the control logic 201 executes one or more algorithms for performing one or more functions of the application engine 103. For example, the control logic 201 interacts with the data assimilation module 203 to determine and/or process real-time data sources 213 available to the UE 101. In one embodiment, the real-time data sources 213 include the telematics data source 107, the service data sources 109, the user log 115, and the geographic database 119. In one embodiment, the data assimilation module 203 includes interfaces (e.g., hardware and/or software interfaces) for connecting to the real-time data sources 213. For example, if the data assimilation function of the application engine 103 is local to the UE 101, the data assimilation module 203 may include one or more hardware interfaces, application programming interfaces (e.g., APIs) for obtaining real-time data from, for instance, the sensors 121 of the UE 101.

In another embodiment, the data assimilation module 203 includes application programming interfaces for accessing the service data sources 109 via the service platform 111 and/or services 113. For example, if a service 113 provides weather data for a given location, the data assimilation module 203 can query or request the weather information from the service via an API call. Moreover, in some embodiments, the data assimilation module 203 can use the location information (e.g., GPS location data) of the UE 101 (e.g., from the telematics data source 107) to obtain weather information for the appropriate real-time locations of one or more UEs 101 (e.g., corresponding to users or players of the application/game). Similarly, the data assimilation module 203 can interface with any other type of service 113 (e.g., social networking services, geo-tagged media services, event services, news services, etc.) to obtain real-time data and/or contextual information with respect to the location of the UEs 101. In one embodiment, the data assimilation module 203 may obtain the real-time data from the real-time data sources 213 continuously, periodically, according to a schedule, on demand, or a combination thereof.

After obtaining the real-time location, the data assimilation module 203 interacts with the application element module 205 to determine what elements of the application engine 103 are to be affected by the real-time data. In one embodiment, the elements of the application engine 103 include, at least in part, application mechanics (e.g., game play mechanics), application functions (e.g., what functions to enable or disable depending on the real-time data), application user interface (e.g., audio/visual themes and assets; modes of interaction—such as touch, voice, image recognition, etc.; and the like), application data (e.g., what data sources or models to use), and/or any other application asset of the application engine 103 and/or the applications employing the application engine 103. Specific types of elements and their dependence on real-time data are further described below with respect to the flowcharts of FIGS. 3-6 and the user interface examples of FIGS. 7A-7I.

In one embodiment, the application element module 205 may determine that transformations of map data elements are needed to reflect the real-time data sources 213. In this case, the application element module 205 interacts with the map transformation module 207 to perform the map transformation process. By way of example, the application engine 103 may be a gaming engine that is basing is its game play world on real-world mapping information (e.g., map tiles from a mapping). To fit the theme or motif of the application or game, the map transformation module 207, for instance, may use a rule-based engine to determine how to transform various map attributes or elements (e.g., streets, freeways, one-way roads, rivers, bike paths, driveways, parking lots, points of interest, terrain features, etc.) into a game or application world. For example, a game with a fantasy theme may transform office buildings into castles, restaurants in to food caches, etc. In one embodiment, the transformations and the rules for performing the transformations may be defined by an application developer.

In one embodiment, the interaction module 209 of the application engine 103 enables multiple users and/or players to interact with the application engine 103 to determine what application elements to affect and/or otherwise transform for presentation to the users. Accordingly, the interaction module 209 enables users to determine what application elements (e.g., what game play mechanics, features, etc.) to present to other users. This user-to-user interaction can be more engaging to the participating parties. For example, as described above, a parent driving a car with a child playing a game can interact with the child's game by giving input or commands to determine when, how, where, etc. to present elements of the game. For example, the parent may provide a surprise treasure or may clear attacking monsters if the game difficulty is too high for a child. In an MMORPG or large user community environment, groups of users may provide input for determining what elements to present to the specific users or the community of users as a whole.

In one embodiment, the interaction module 209 also enables sharing and reporting of achievements by a user or player to another user. For example, a child may share a report with a remote parent or grandparent that he or she has completed a particularly difficult level or has encountered an unusual item or artifact along a particular route. In some embodiments, the report may be accompanied with location information of where the report or achievement occurred. In this way, the report can also serve a location tracking and reporting function for the remote parent, grandparent, or other user.

Figure 3:
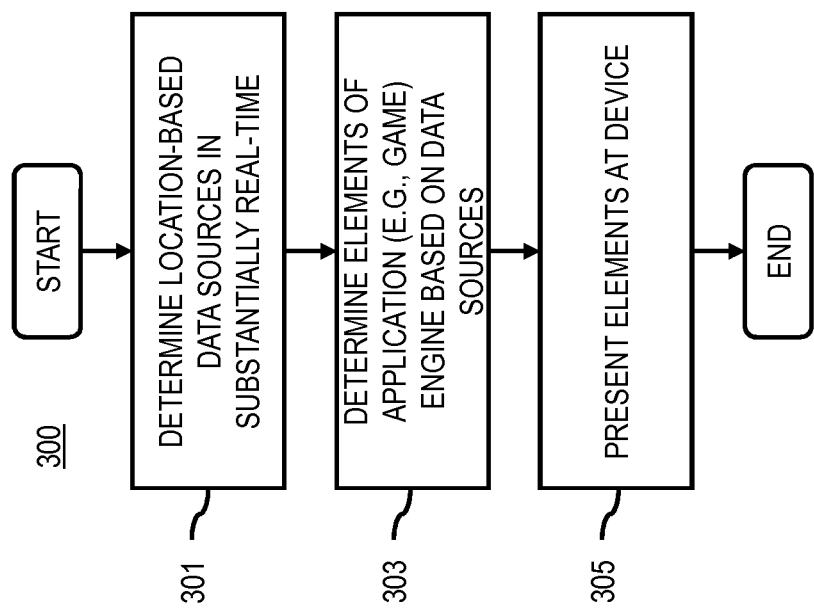
FIG. 3 is a flowchart of a process for determining elements of an application engine based on real-time location-based data sources, according to one embodiment.
Figure 9:
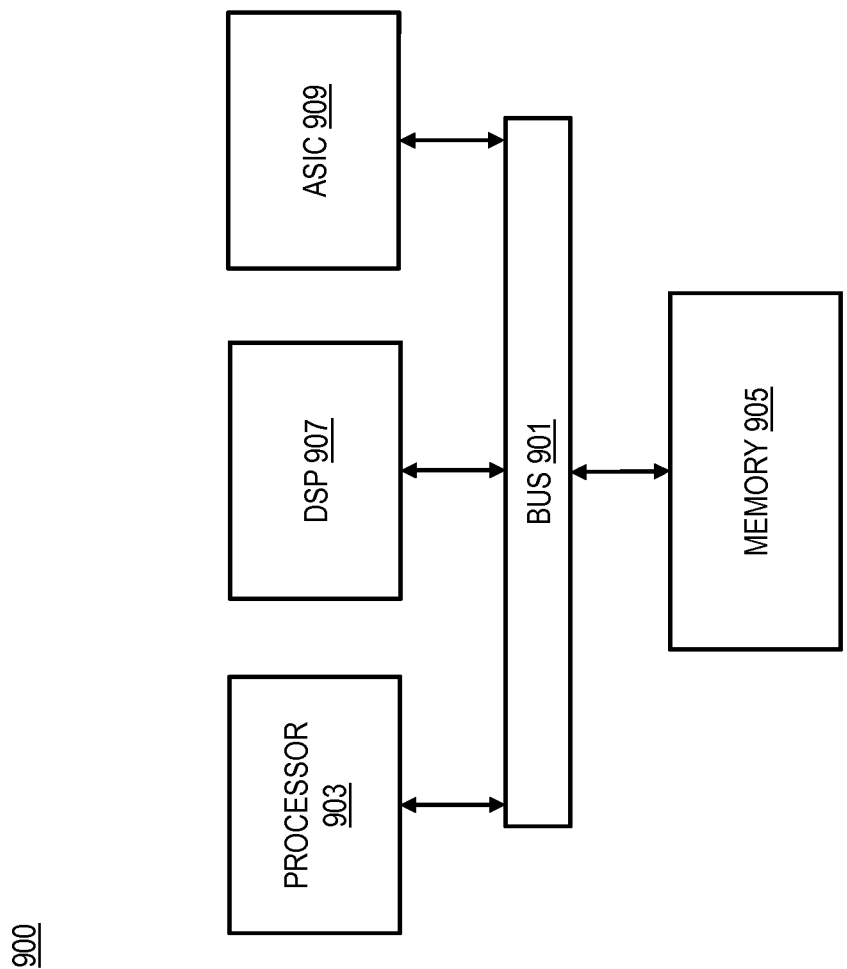
FIG. 9 is a diagram of a chip set that can be used to implement an embodiment of the invention.

FIG. 3 is a flowchart of a process for determining elements of an application engine based on real-time location-based data sources, according to one embodiment. In one embodiment, the application engine 103 performs the process 300 and is implemented in, for instance, a chip set including a processor and a memory as shown in FIG. 9. In addition or alternatively, the application engine client 125 can perform all or a portion of the process 300.

In step 301, the application engine 103 determines one or more location-based data sources 213 associated with at least one device (e.g., UE 101). In one embodiment, the one or more location-based data sources are determined in at least substantially real-time while the at least one device is engaged in at least one travel activity (e.g., commuting). In one embodiment, the one or more location-based data sources include navigation information, telematics information, location contextual information, user contextual information, local event information, social networking information, or combination thereof.

In step 303, the application engine 103 determines one or more elements of an application engine based, at least in part, on the one or more location-based data sources. In one embodiment, the application engine includes, at least in part, a gaming engine. In another embodiment, the one or more elements include, at least in part, one or more elements of game play mechanics. In one embodiment, the application engine 103 may have rules (e.g., designated or defined by an application developer) that specify what elements are affected by what real-time data source. For example, rules may specify that weather data can affect both the rendering of weather effects in the game as well as the performance characteristics of items in the game. For example, torches or fire related items may not be as effective or may last for a shorter duration when the real-time weather indicates that it is raining at the UE 101's location.

In step 305, the application engine 103 causes, at least in part, the one or more elements at the least one device during the at least one travel activity. In one embodiment, the presentation of the one or more elements is in a mapping user interface. In another embodiment, the one or more elements include, at least in part, one or more map data elements. For example, game play maps can be used to replicate real-time maps of the location in which the UE 101 or the user is traveling.

In one embodiment, the application engine 103 determines navigation information, telematics information, or a combination thereof from the one or more location-based data sources. The application engine 103 then processes and/or facilitates a processing of the navigation information, the telematics information, or a combination thereof to determine an estimated time of arrival among one or more locations, routing information, or a combination thereof. The application engine 103 then determines a duration for interacting with the application engine, one or more applications employing the application engine, or a combination thereof based, at least in part, on the estimated time of arrival, the routing information, or a combination thereof. In one embodiment, the presentation is based, at least in part, on the determined duration. For example, if navigation information estimates a time of arrival at a destination in 15 minutes, the application engine 103 may provide for game play that is intended to also last for 15 minutes. In this way, the user can expect to complete game play by the time the destination is reached. For example, when commuting to school, game play for children can be tailored so that the game can be completed or come a suitable stopping point on reaching the school.

Figure 4:
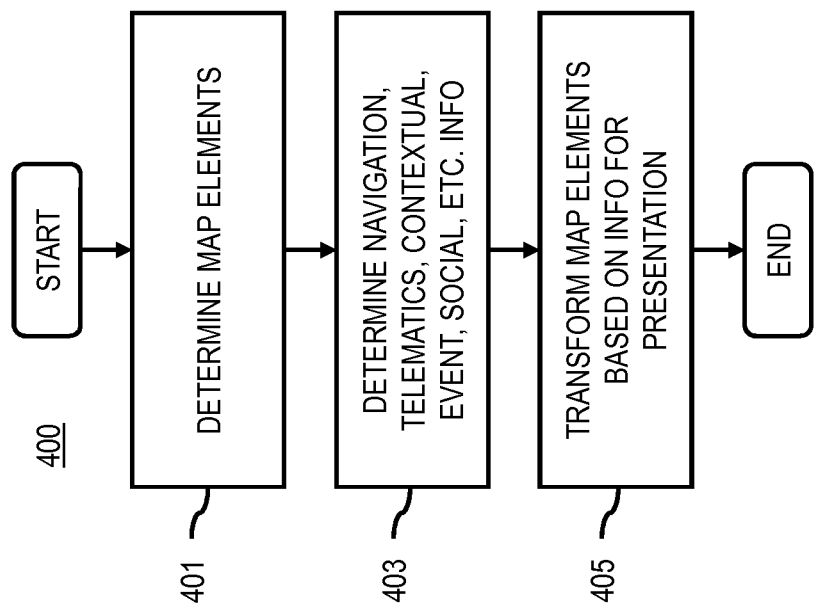
FIG. 4 is a flowchart of a process for transforming map data elements based on real-time location-based data sources, according to one embodiment.

FIG. 4 is a flowchart of a process for transforming map data elements based on real-time location-based data sources, according to one embodiment. In one embodiment, the application engine 103 performs the process 400 and is implemented in, for instance, a chip set including a processor and a memory as shown in FIG. 9. In addition or alternatively, the application engine client 125 can perform all or a portion of the process 400. In one embodiment, the process 400 assumes that the process 300 is being performed by the application engine 103, and that the application engine 103 has determined that a map transformation is to be performed to reflect the real-time data sources 213.

In step 401, the application engine 103 determines the map elements that are to be transformed. In one embodiment, the application engine 103 determines a user location, navigation information (e.g., destination, waypoints, routes, etc.) to identify what map elements (e.g., map tiles, points of interest, etc.) should be identified for processing. In one embodiment, the application engine can use the current location information as well as make predictions of what map elements are likely to be needed given, for instance, historical travel patterns, current trajectory, intended trip purpose, time of day, day of week, season, etc.

In step 403, the application engine 103 processes and/or facilitates a processing of the real-time data sources 213 to determine real-time data for transforming the map elements. In one embodiment, the one or more location-based data sources 213 include navigation information, telematics information, location contextual information, user contextual information, local event information, social networking information, or combination thereof. In one embodiment, the real-time data can be updated continuously, periodically, according to a schedule, on demand, or a combination thereof.

In step 405, the application engine 103 causes, at least in part, a transformation of the one or more map data elements based, at least in part, on the one or more location-based data sources. In one embodiment, the application engine 103 determines the transformation based, at least in part, on (a) one or more motifs associated with the application engine, one or more applications employing the application engine, or a combination thereof; (b) a type, a dimension, a structure, a point of interest, or a combination thereof associated with the one or more map data elements; or (c) one or more transformation rules; or (d) a combination thereof. For example, each application or game executing via the application engine 103 may specify different motifs/themes or media assets (e.g., graphics, sounds, files, etc.) to reflect game play. In some embodiments, the user may select a theme or motif for the application or game.

Figure 5:
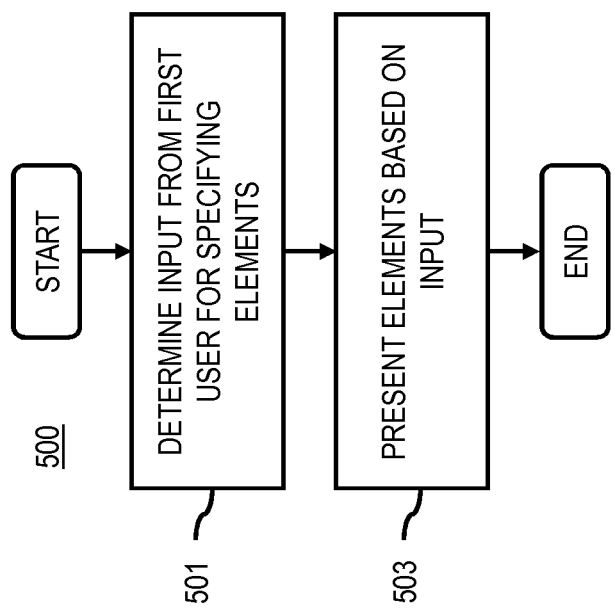
FIG. 5 is a flowchart of a process for interaction among multiple users for determining elements of an application engine, according to one embodiment.

FIG. 5 is a flowchart of a process for interaction among multiple users for determining elements of an application engine, according to one embodiment. In one embodiment, the application engine 103 performs the process 500 and is implemented in, for instance, a chip set including a processor and a memory as shown in FIG. 9. In addition or alternatively, the application engine client 125 can perform all or a portion of the process 500.

One aspect of traditional commuting or travel is that, even when traveling in groups, when one user engages in an immersive application or game, that user tends to become disconnected from other users in the same travel group or vehicle. For example, parents may find that their child becomes detached and less engaged with the parent when the child is engaged in a game. The application engine 103 addresses these concerns by providing interaction mechanisms among multiple users or players. In one embodiment, the interaction mechanisms are also applicable large user communities such as MMORPG environments.

In step 501, the application engine 103 determines an input from a first user for specifying one or more elements of the application engine 103 that are to be affected. In this use case, the first user (e.g., a parent) can provide input to the application engine 103 that will cause a corresponding interaction with a second user (e.g., a child) using an application. For example, in a gaming application, a parent may specify when items are to appear or what functions to invoke in the child's game play. The parent, for instance, may (e.g., through voice command or through another device) make a character roar or move in the game application or invoke any other function of the application.

In one embodiment, a voice command may be issue directly to the UE 101 of the child if the microphone on the UE 101 is active an able to capture the voice input. In another embodiment, the voice command may be issued via short range wireless connectivity (e.g., Bluetooth) over a headset or in-car hands-free system. In another embodiment, the parent or first user may issue a command via the parent's own device. The parent's device may then connect to the child's device (e.g., directly via peer-to-peer or over a server) to transmit the command.

In another embodiment, the first user or parent may preplan the game configuration before the trip. For example, the parent may configure game parameters for the child at the same time a route is entered in a navigation system (e.g., an in-vehicle navigation system, personal navigation device, etc.).

In step 503, the application engine 103 causes, the presentation of the one or more elements is for a second user interacting with the at least one device. In one embodiment, depending on the application, the elements may be presented on issuing of the command. In other embodiments, the application engine 103 can queue the elements and present them when appropriate to the child or second user.

Figure 6:
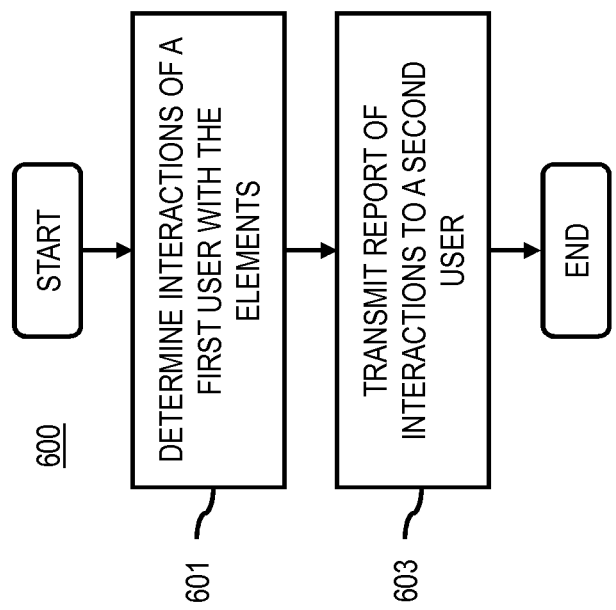
FIG. 6 is a flowchart of process for reporting user interaction with an application engine based on real-time location-based data sources, according to one embodiment.

FIG. 6 is a flowchart of process for reporting user interaction with an application engine based on real-time location-based data sources, according to one embodiment. In one embodiment, the application engine 103 performs the process 600 and is implemented in, for instance, a chip set including a processor and a memory as shown in FIG. 9. In addition or alternatively, the application engine client 125 can perform all or a portion of the process 600.

As another form of interaction, the application engine 103 enables a sharing of achievements or other interactions among users. For example, in step 601, the application engine 103 determines one or more interactions with one or more elements of the application engine 103 by a first user. In this example, the interaction can be any type of activity performed by the first user (e.g., a child) during game play. The interaction, for instance, can include capturing an item or creature, reaching a particular level, discovering hidden treasure, etc. In one embodiment, the application engine 103 records the interaction and enables the first user to share the interaction with a second user. By way of example, the second user (e.g., a parent, grandparent, friend, etc.) can be in the same vehicle, nearby, or located remotely.

In step 603, the application engine 103 causes, at least in part, a transmission of one or more reports of the one or more interactions to a second user. In one embodiment, the reports of the interactions may be geo-tagged or may reference specific locations. In this way, the reports serve as confirmation of the first user's (e.g., a child's location). For example, if the child is commuting to school, reports of achievements occurring along the child's normal route to school can serve as additional assurance that the child is on his or her normal route to school.

Figure 7B:
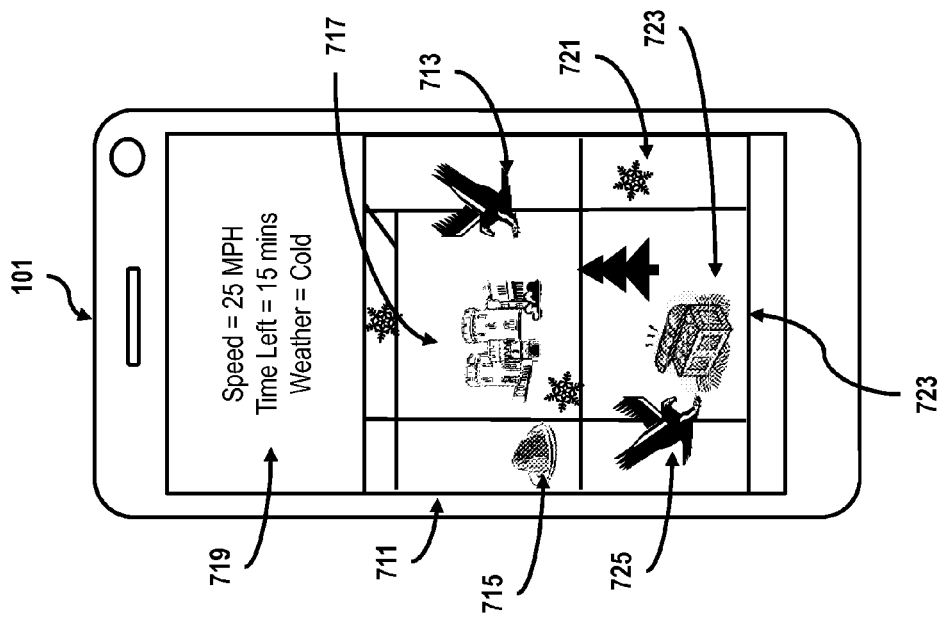
Figure 7A:
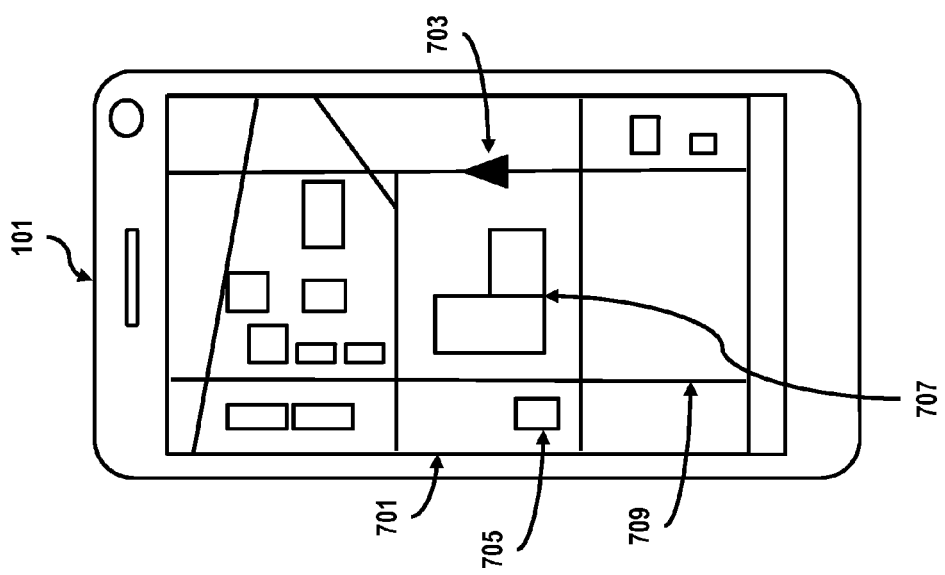

FIGS. 7A-7I are diagrams of user interfaces utilized in the processes of FIGS. 1-6, according to various embodiments. FIG. 7A illustrates a UE 101 displaying a traditional map interface 701. As shown, map interface 701 displays an aerial view of the map the user's current location indicated by an arrow 703. In addition, a point of interest (POI) 705 (e.g., a restaurant) and another POI 707 (e.g., a government building) are depicted as they naturally appear in the real world.

FIG. 7B illustrates a game user interface 711 that is a transformation of the map interface 701 of FIG. 7A. In this example, the application engine 103 has transformed the map interface 701 into the game user interface 711 according to a fantasy motif. The game play, for instance, involves collecting treasure and fighting other creatures in the fantasy world as they are encountered in the along the transformed gamed user interface 711. For example, the arrow 703 indicating the user's position has been transformed into an eagle 713 that represents the user's character in the game. Similarly, the restaurant POI 705 has been transformed into a food station 715 and the government building POI 707 has been transformed into a castle 717. These transformed POIs 715 and 717 provide for unique interaction with the user's character 713. For example, when approaching the food station 715 (e.g., as indicated by real-world travel data coming from navigation data and/or car telematics), the user will be receive additional power or points.

As shown in FIG. 7B, the game user interface 711 also includes a section 719 that presents real-time data that can affect game play. For example, section 719 displays the actual speed of the user (e.g., 25 MPH), the time left to the destination (e.g., 15 mins), and the current weather condition around the user (e.g., cold). As shown, the application engine 103 can render snowflakes 721 to represent the cold weather. In addition, the cold weather can be used to determine what power or characteristics the user 713 possesses as well as what potential creatures the user 713 may encounter in the gaming world. In addition, the application engine can use the time left (e.g., 15 mins) information to structure game play so that the game can be completed within the available time. Similarly, the application engine 103 can use the actual speed of navigation (e.g., 25 MPH) to determine the characteristics of the user's eagle 713. Other real-time conditions such as traffic (not shown) can be used to affect game play (e.g., more traffic may make it more difficult to fight other creatures in the game).

In one embodiment, treasure 723 can be hidden in the environment for the user 713 to discover. By way of example, the treasure 723 can be specified or hidden by other users such as other players or parents as described above. In cases where another player is nearby, the application engine 103 can render another eagle 725 to represent that player in the game user interface 711.

In another embodiment, the application engine can employ a map transform algorithm to determine what type of terrain to transform a city block (e.g., city block 709 of FIG. 7A). In one embodiment, the map transform algorithm can be based on game type, dimensions of the city block, building structure present on the city block, landmarks, user customizable POIs, traffic conditions and the like. In this case, because city block 709 is nearly empty, the application engine 103 transforms the city block 709 into a park 727 of equal size to the city block 709. As previously discussed, the application engine 109 can use a rule-based algorithm for determining how specific map elements (e.g., the city block 709) are to be transformed.

Figure 7C:
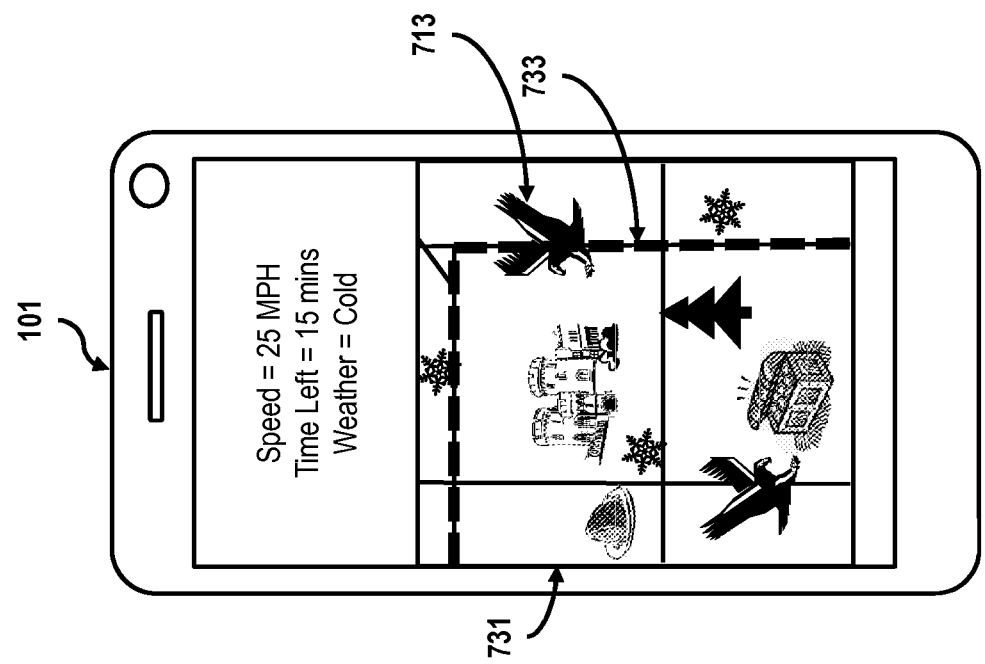

FIG. 7C illustrates a transformed game user interface 731 that can be used to track an actual location of the user during game play. As shown, user interface 731 has been transformed into a game world. However, because the game world is based on actual location, the application engine 103 can also render actual routing and navigation information on the game user interface 731. In this example, the application engine renders the current route of the commute. In this way, a user (e.g., a child) engaged in the game can nonetheless follow along the route with their character (e.g., eagle 713) as their marker.

In addition, the game user interface 731 is an interactive and immersive experience whereby tapping or otherwise interacting with elements (e.g., treasure, creatures, food, etc.) can present side challenges presented through game play user interfaces.

Figure 7D:
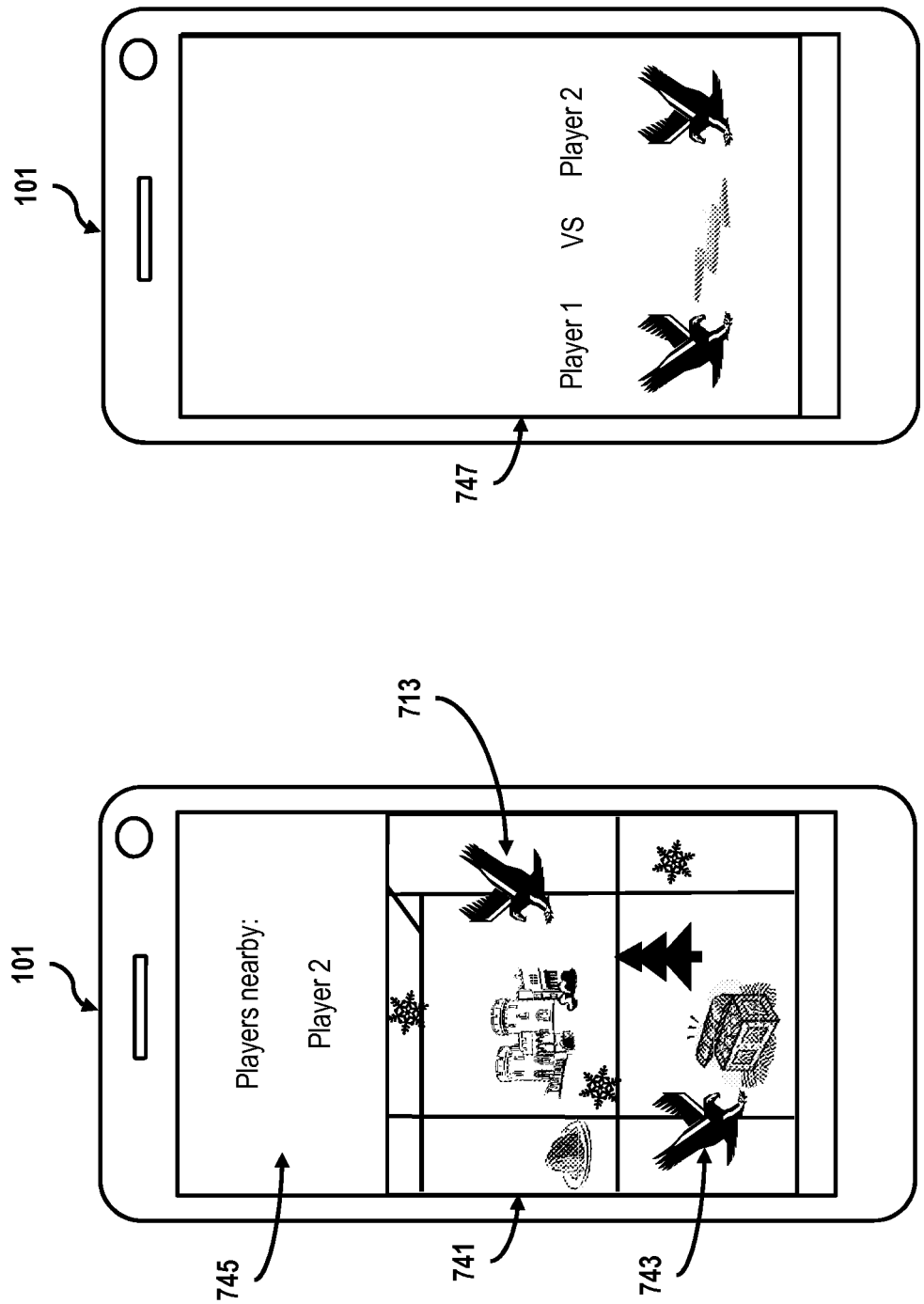

FIG. 7D illustrates an example of interacting with another player depicted in the user interface 741 to initiate a side challenge. As shown user interface 741 depicts a thematic map in which Player 2 (e.g., as indicated by eagle 743) approaches the user as indicated by eagle 713. In one embodiment, the approach reflects real-time location data associated with the user and Player 2. The application engine 103 presents an alert 745 to notify the user that Player 2 is nearby. The user can then tap on Player 2's eagle 743 to initiate a combat side challenge game. As shown in user interface 747, the combat side challenge game is presented in its own user interface and enables the user and Player 2 to engage in game combat.

Figure 7E:
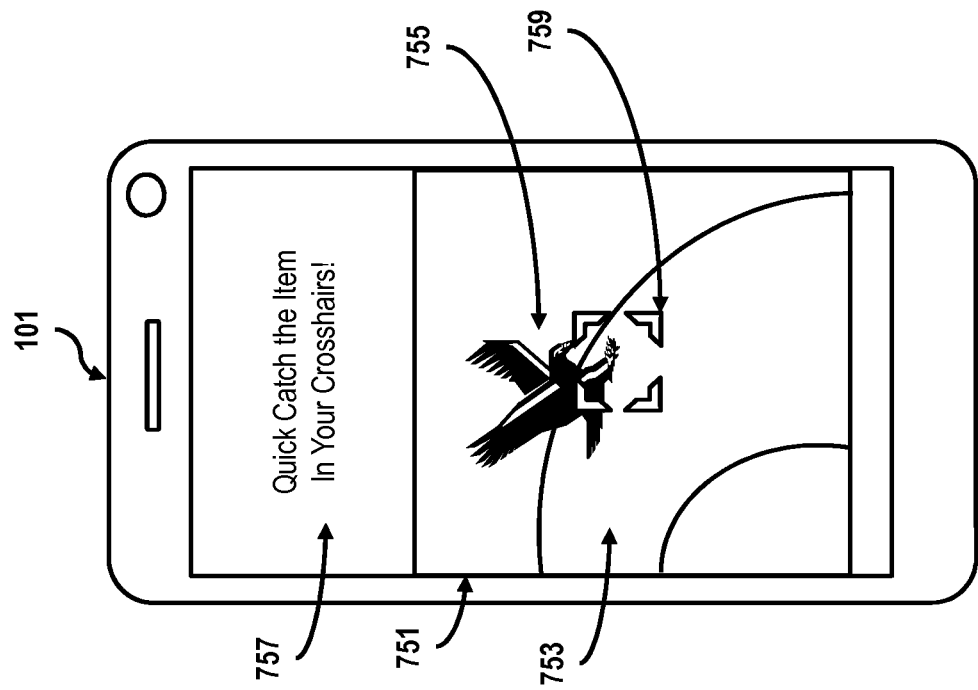

FIG. 7E illustrate another example of a side challenge. In this case, the application engine depicts an augmented reality user interface 751 whose perspective and view as based on real-time location-based data. In this case, the user has approached a road 753 on which a trophy eagle 755 has been positioned (e.g., by a parent user or other user). For example, the road 753 is a transformed version of a road that exists in the corresponding real-world location based on the user's current location. The user's approach (e.g., as determined from real-time location data) triggers the application engine 103 to alert the user of the challenge (e.g., "Quick catch the item in your crosshairs!"). In this case, the user can move the UE 101 to position the eagle 755 within the crosshairs 759 to complete the challenge.

Figure 7F:
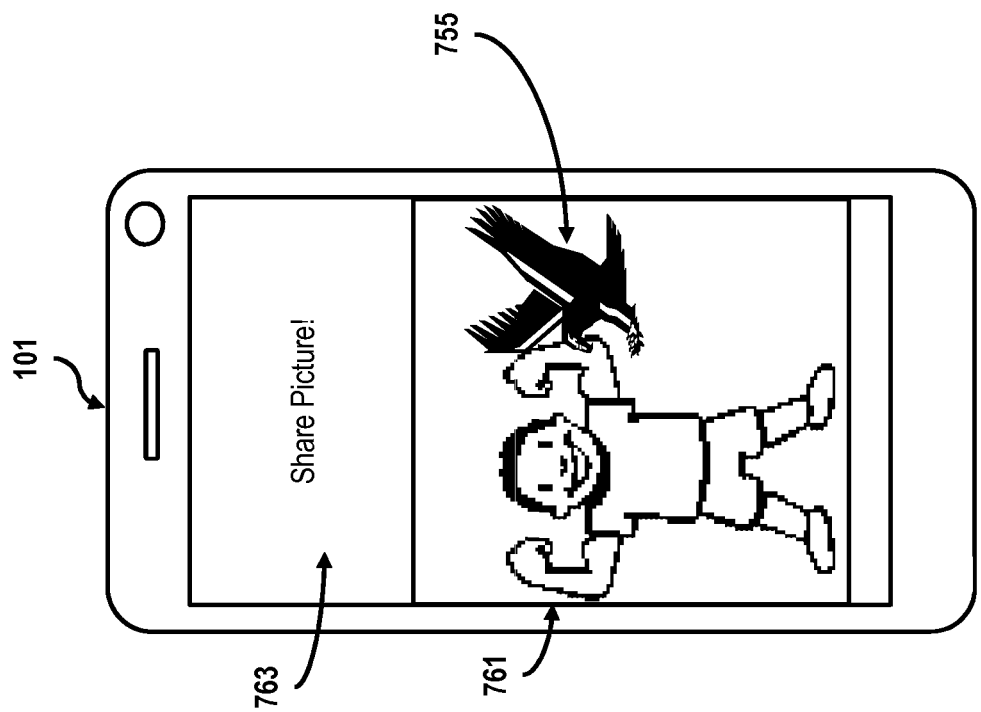

FIG. 7F illustrates a user interface 761 that memorializes the user's completion of the challenge of FIG. 7E. In this case, the user is able to take a picture of himself (e.g., via a front facing camera of the UE 101). The application engine 103 then superimposes the capture trophy eagle 755 in the picture and provides an option 763 for the user to share the picture. In one embodiment, on selecting the option 763 to share the picture, the application engine creates a message (e.g., email, instant message, social networking post, etc.) to share the picture with user selected recipients. In one embodiment, the picture can be geotagged with location information determined at the time the achievement was completed.

FIG. 7G illustrates a user interface 771 providing for parental interaction with game play presented on a child's device as depicted in user interface 781 of FIG. 7H. As shown in FIG. 7G, user interface 771 provides options 773a-773b (also collectively referred to as options 773) for initiating game play elements in the child's user interface 781. In this example, options 773a-773d provide respectively the ability to initiate the following game play elements: (773a) initiate playing of an eagle screech sound, (773b) initiate an eagle attack, (773c) clear attackers, and (773d) add treasure. As previously discussed, parental interaction input can be performed directly on the child's device through, for instance, voice commands so that a separate device for the parent is not needed. In this example, the parent selects option 773a to initiate a screech. Accordingly, the application engine 103 plays a screech emanating from the eagle 713 in the user interface 781.

Figure 7I:
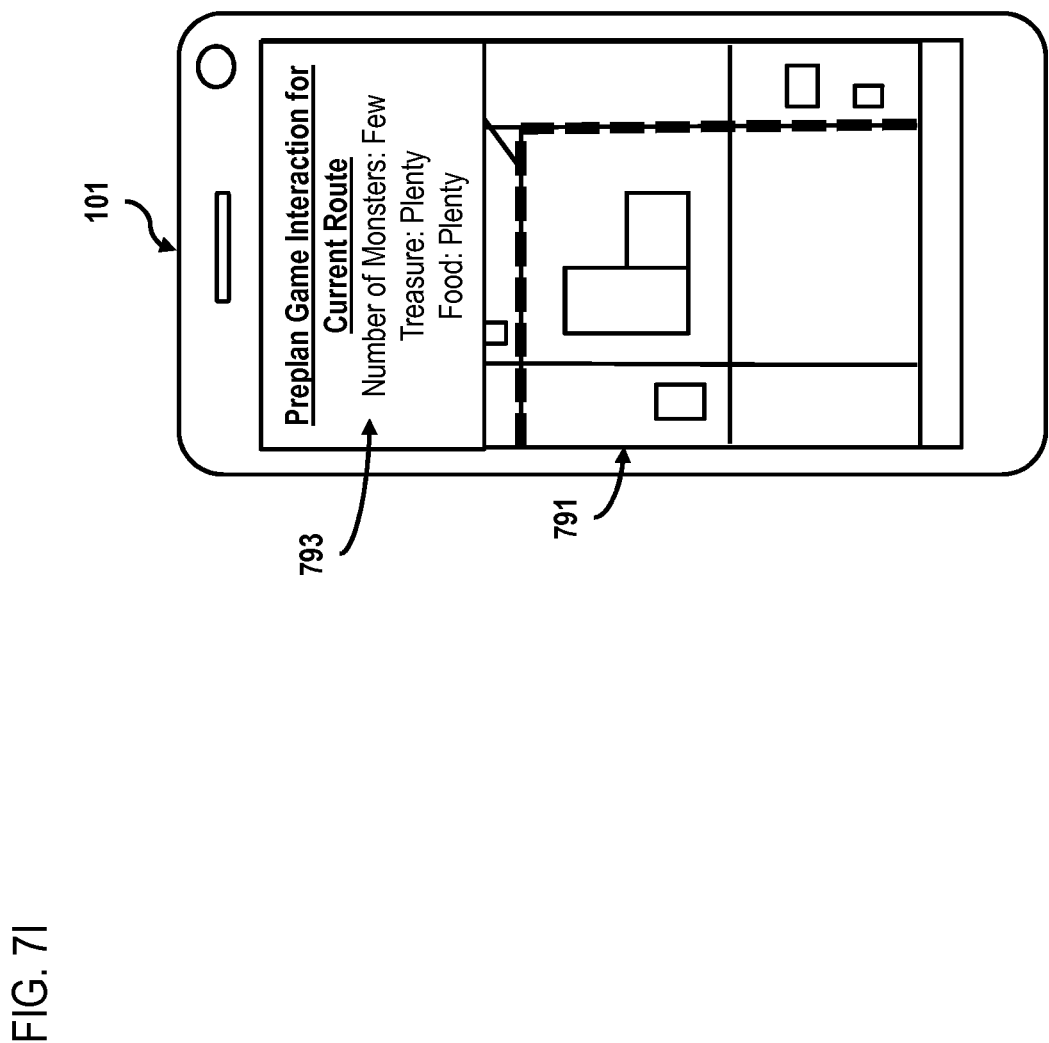

FIG. 7I illustrates a user interface 791 that enables parents to preplan game or application configuration on a child's device before initiating a commute or travel activity. In this example, the user interface 791 is presented when, for instance, the parent initiates routing in a navigation application. The application engine 103 can then present a parent with a form 793 for inputting a number of game parameters that will operate on the child's device during the commute. For example, the parent may specify the number of monsters, the number of treasure, the amount of food, etc. that will appear during in the child's game during the commute or travel activity.

The processes described herein for providing an application engine based on real-time location-based data may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
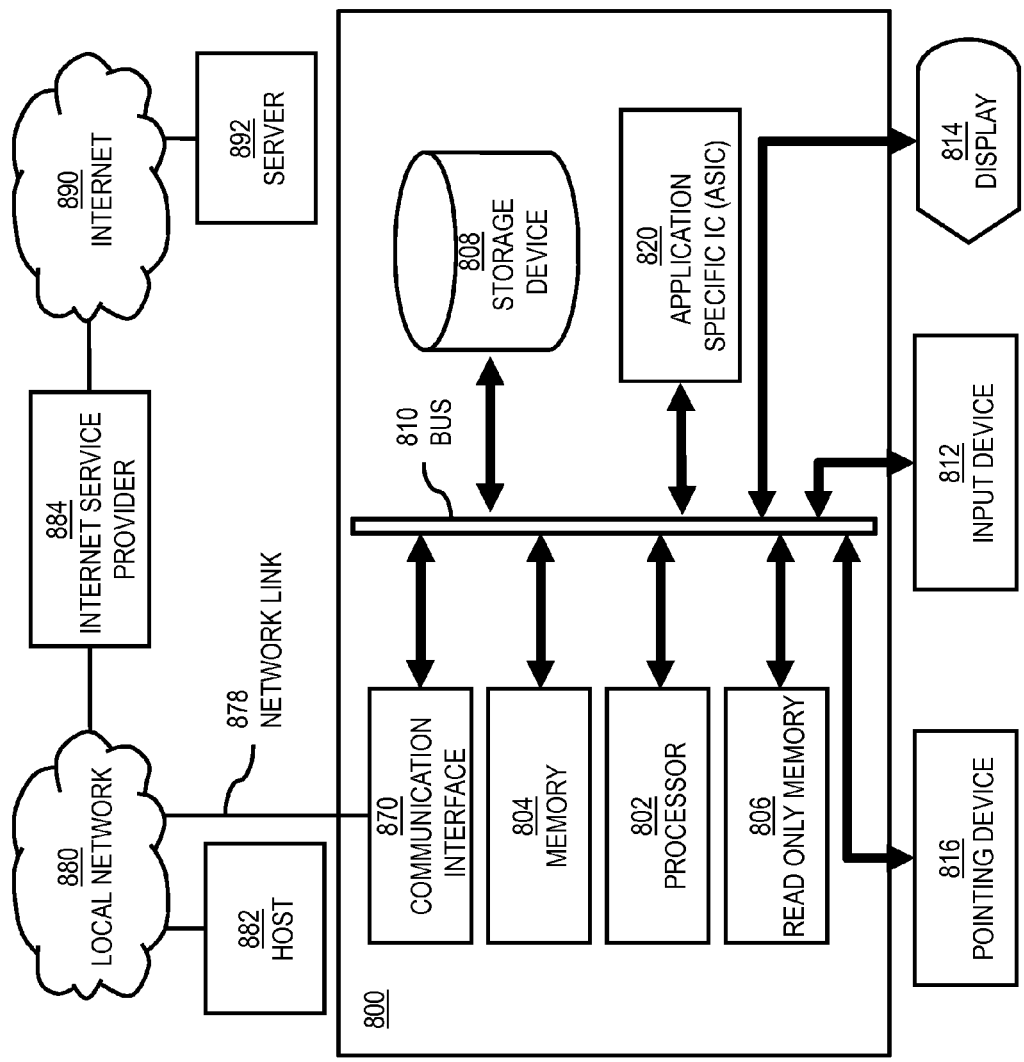
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide an application engine based on real-time location-based data as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing an application engine based on real-time location-based data.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing an application engine based on real-time location-based data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing an application engine based on real-time location-based data. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing an application engine based on real-time location-based data, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing an application engine based on real-time location-based data to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide an application engine based on real-time location-based data as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing an application engine based on real-time location-based data.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide an application engine based on real-time location-based data. The memory 905 also stores the data associated with or generated by the execution of the inventive steps.

Figure 10:
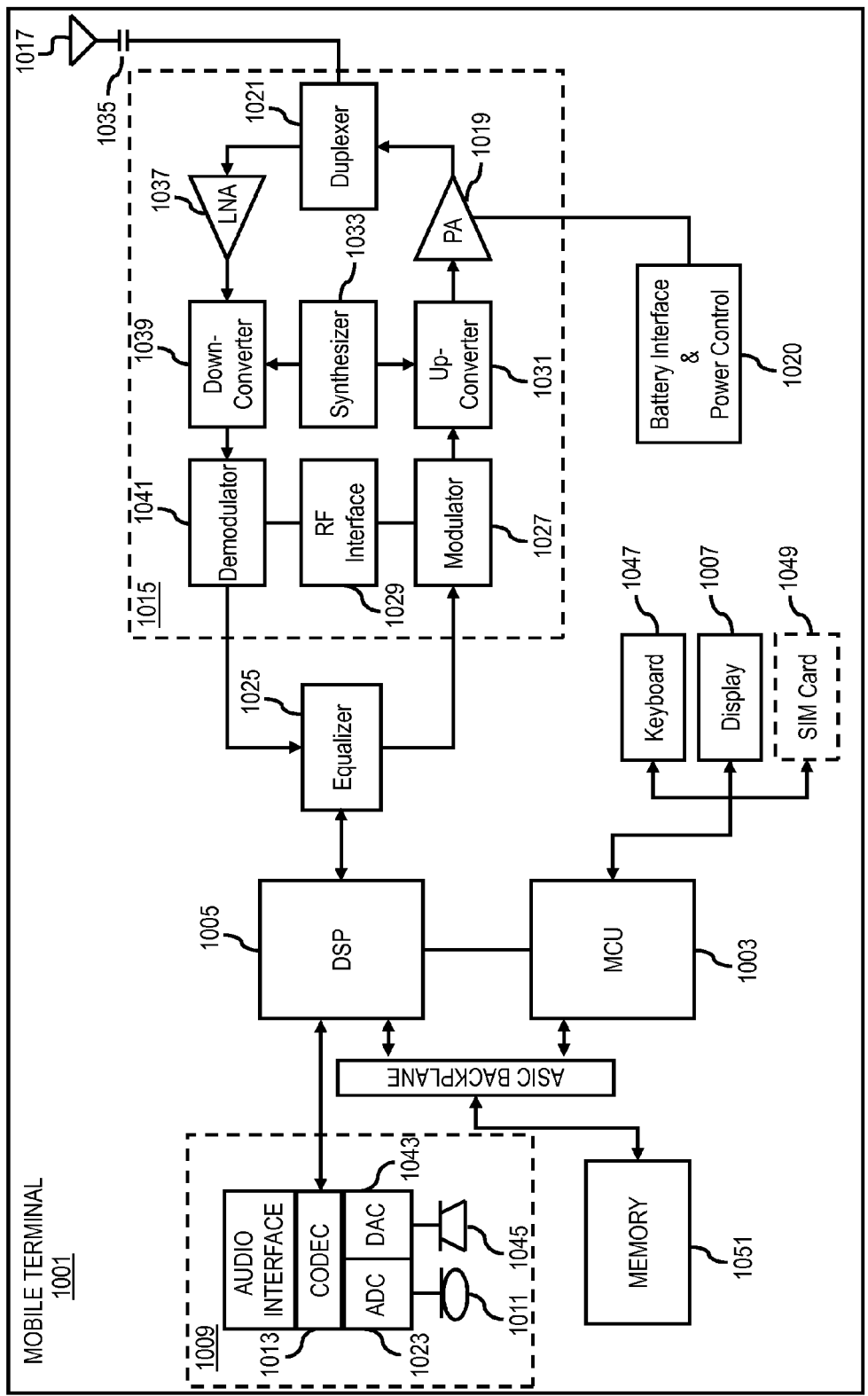
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing an application engine based on real-time location-based data. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing an application engine based on real-time location-based data. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide an application engine based on real-time location-based data. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining one or more location-based data sources associated with at least one device, wherein the one or more location-based data sources are determined in at least substantially real-time while the at least one device is engaged in at least one travel activity;
   determining, by a processor, one or more real-time data including one or more of local news events and geo-tagged media;
   determining, by the processor, one or more elements of an application engine based, at least in part, on the one or more location-based data sources;
   presenting the one or more elements at the least one device during the at least one travel activity, wherein the presentation of presenting the one or more elements is based, at least in part, on the one or more real-time data; and
   determining a duration for interacting with the application engine, one or more applications employing the application engine, or a combination thereof based, at least in part, on an estimated time of arrival, routing information, or a associated with the at least one travel activity,
   wherein the application engine includes, at least in part, a gaming engine, the one or more elements include, at least in part, one or more elements of game play mechanics, and the game play mechanics are affected by vehicle telematics information, and
   wherein the gaming engine provides for a game play that lasts for a time corresponding to the determined duration for interacting with the application engine.

2. A method of claim 1, wherein the gaming engine supports, at least in part, a single-user game player, a multiple-user gameplay, a group gameplay, or a combination thereof.

3. A method of claim 1, wherein the presenting the one or more elements is elements comprises presenting the one or more elements in a mapping user interface, and wherein the one or more elements include, at least in part, one or more map data elements.

4. A method of claim 3, further comprising:
   transforming the one or more map data elements based, at least in part, on the one or more location-based data sources.

5. A method of claim 4, wherein the
   transforming the one or map data elements is further based, at least in part, on (a) one or more motifs associated with the application engine, the one or more applications, or a combination thereof; (b) a type, a dimension, a structure, a point of interest, or a combination thereof associated with the one or more map data elements; or (c) one or more transformation rules; or (d) a combination thereof,
   wherein one of the one or more motifs is selected by a user of the at least one device.

6. A method of claim 1, wherein the one or more location-based data sources include navigation information, telematics information, location contextual information, user contextual information, local event information, social networking information, or combination thereof.

7. A method of claim 6, further comprising:
   processing the navigation information, the telematics information, or a combination thereof to determine the estimated time of arrival among one or more locations, the routing information, or a combination thereof associated with the at least one travel activity.

8. A method of claim 1, further comprising: specifying the one or more elements via an input from a first user,
   wherein the presenting the one or more elements is for a second user interacting with the at least one device.

9. A method of claim 1, further comprising:
   determining one or more interactions with the one or more elements by a first user; and
   determining to transmit one or more reports of the one or more interactions to a second user.

10. An apparatus comprising:
    at least one processor; and
    at least one memory including computer program code for one or more programs,
    the at least one memory and the computer program code configured to, with the at least one processor, cause the apparatus to perform at least the following,
    determine one or more location-based data sources associated with at least one device, wherein the one or more location-based data sources are determined in at least substantially real-time while the at least one device is engaged in at least one travel activity;
    determine one or more real-time data including one or more of local news events and geo-tagged media;
    determine one or more elements of an application engine based, at least in part, on the one or more location-based data sources;
    cause, at least in part, the one or more elements at the least one device during the at least one travel activity, wherein the presentation of the one or more elements is based, at least in part, on the one or more real-time data;
    cause, at least in part, an alteration of an appearance of the one or more map data elements based, at least in part, on the one or more location-based data source; and
    determine a duration for interacting with the application engine, one or more applications employing the application engine, or a combination thereof based, at least in part, on an estimated time of arrival, routing information, or a combination thereof associated with the at least one travel activity, wherein the application engine includes, at least in part, a gaming engine, the one or more elements include, at least in part, one or more elements of game play mechanics, and the game play mechanics are affected by vehicle telematics information, and wherein the gaming engine provides for a game play that lasts for a time corresponding to the determined duration for interacting with the application engine.

11. An apparatus of claim 10, wherein the gaming engine supports, at least in part, a single-user game player, a multiple-user gameplay, a group gameplay, or a combination thereof.

12. An apparatus of claim 10, wherein the presentation of the one or more elements is in a mapping user interface, and wherein the one or more elements include, at least in part, one or more map data elements.

13. An apparatus of claim 12, wherein the apparatus is further caused to:

cause, at least in part, a transformation of the one or more map data elements based, at least in part, on the one or more location-based data sources.

14. An apparatus of claim 13, wherein the apparatus is further caused to:

determine the transformation based, at least in part, on (a) one or more motifs associated with the application engine, the one or more applications, or a combination thereof; (b) a type, a dimension, a structure, a point of interest, or a combination thereof associated with the one or more map data elements; or (c) one or more transformation rules; or (d) a combination thereof, wherein one of the one or more motifs is selected by a user of the at least one device.

15. An apparatus of claim 10, wherein the one or more location-based data sources include navigation information, telematics information, location contextual information, user contextual information, local event information, social networking information, or combination thereof.

16. An apparatus of claim 15, wherein the apparatus is further caused to:

process and/or facilitate a processing of the navigation information, the telematics information, or a combination thereof to determine the estimated time of arrival among one or more locations, the routing information, or a combination thereof associated with the at least one travel activity.

17. An apparatus of claim 10, wherein the apparatus is further caused to:

determine an input from a first user for specifying the one or more elements, wherein the presentation of the one or more elements is for a second user interacting with the at least one device.

18. An apparatus of claim 10, wherein the apparatus is further caused to:

determine one or more interactions with the one or more elements by a first user; and cause, at least in part, a transmission of one or more reports of the one or more interactions to a second user.

* * * * *